United States Patent [19]

Lund

[11] Patent Number: 5,199,026
[45] Date of Patent: Mar. 30, 1993

[54] TOKEN RING WIRING CONCENTRATOR

[75] Inventor: Stephen R. Lund, Wake County

[73] Assignee: Memorex Telex N.V., Tulsa, Okla.

[21] Appl. No.: 662,723

[22] Filed: Feb. 27, 1991

[51] Int. Cl.$^5$ .................................... H04Q 11/00
[52] U.S. Cl. .................................. 370/56; 370/85.5
[58] Field of Search .................. 370/85.13, 85.5, 56, 370/55

[56] References Cited

U.S. PATENT DOCUMENTS

| | | | |
|---|---|---|---|
| Re. 32,516 | 10/1987 | Cantwell, Jr. | 370/89 |
| 4,121,054 | 10/1978 | Popkin | 370/55 |
| 4,484,086 | 11/1984 | Koppl | 307/112 |
| 4,527,216 | 7/1985 | Stammely | 361/156 |
| 4,551,671 | 11/1985 | Annunziata et al. | 324/51 |
| 4,638,477 | 1/1987 | Okada et al. | 370/85.5 |
| 4,674,086 | 6/1987 | Szczepanek et al. | 370/86 |
| 4,686,380 | 8/1987 | Angott | 307/125 |
| 4,697,047 | 9/1987 | Hirai et al. | 178/2 C |
| 4,701,630 | 10/1987 | Annunziata et al. | 307/112 |
| 4,782,245 | 11/1988 | Henry | 307/112 |
| 4,805,191 | 2/1989 | Burch et al. | 375/11 |
| 4,810,898 | 3/1989 | Rocci et al. | 307/115 |
| 4,820,935 | 4/1989 | Gontowski | 307/112 |
| 4,823,023 | 4/1989 | Shimpo et al. | 307/254 |
| 4,825,096 | 4/1989 | Fabriri et al. | 307/112 |
| 4,835,406 | 5/1989 | Ronndahl | 315/83 |
| 4,866,739 | 9/1989 | Agazzi et al. | 375/106 |
| 4,876,700 | 10/1989 | Grindahl | 375/87 |
| 4,905,230 | 2/1990 | Madge et al. | 370/85.5 |
| 4,935,926 | 6/1990 | Herman | 370/85.13 |
| 4,937,840 | 6/1990 | Hotine | 375/53 |

OTHER PUBLICATIONS

Local Area Networks: Token Ring Access Method, ANSI/EEE, Std802.5-1985, "Station Attachment Specifications-Shielded Twisted Pair," pp. 77-81, appendix C1-C4.

Primary Examiner—Douglas W. Olms
Assistant Examiner—Ajit Patel
Attorney, Agent, or Firm—Head & Johnson

[57] ABSTRACT

In a token ring network wiring concentrator providing a low current/low voltage DC control signal to control insertion and removal of a work station, an improved concentrator lobe having a latching relay with a closed position in which communication is provided between a token ring network and a work station and an open position in which such communication is severed, an insertion relay driver circuit responsive to the DC control signal to close the latching relay when the DC control signal reaches a preselected minimum level, a removal relay driver circuit responsive to the DC control signal for opening the latching relay when the DC control signal falls below a preselected level and an insertion indicator LED for indicating when the work station is connected to the token ring network.

6 Claims, 1 Drawing Sheet

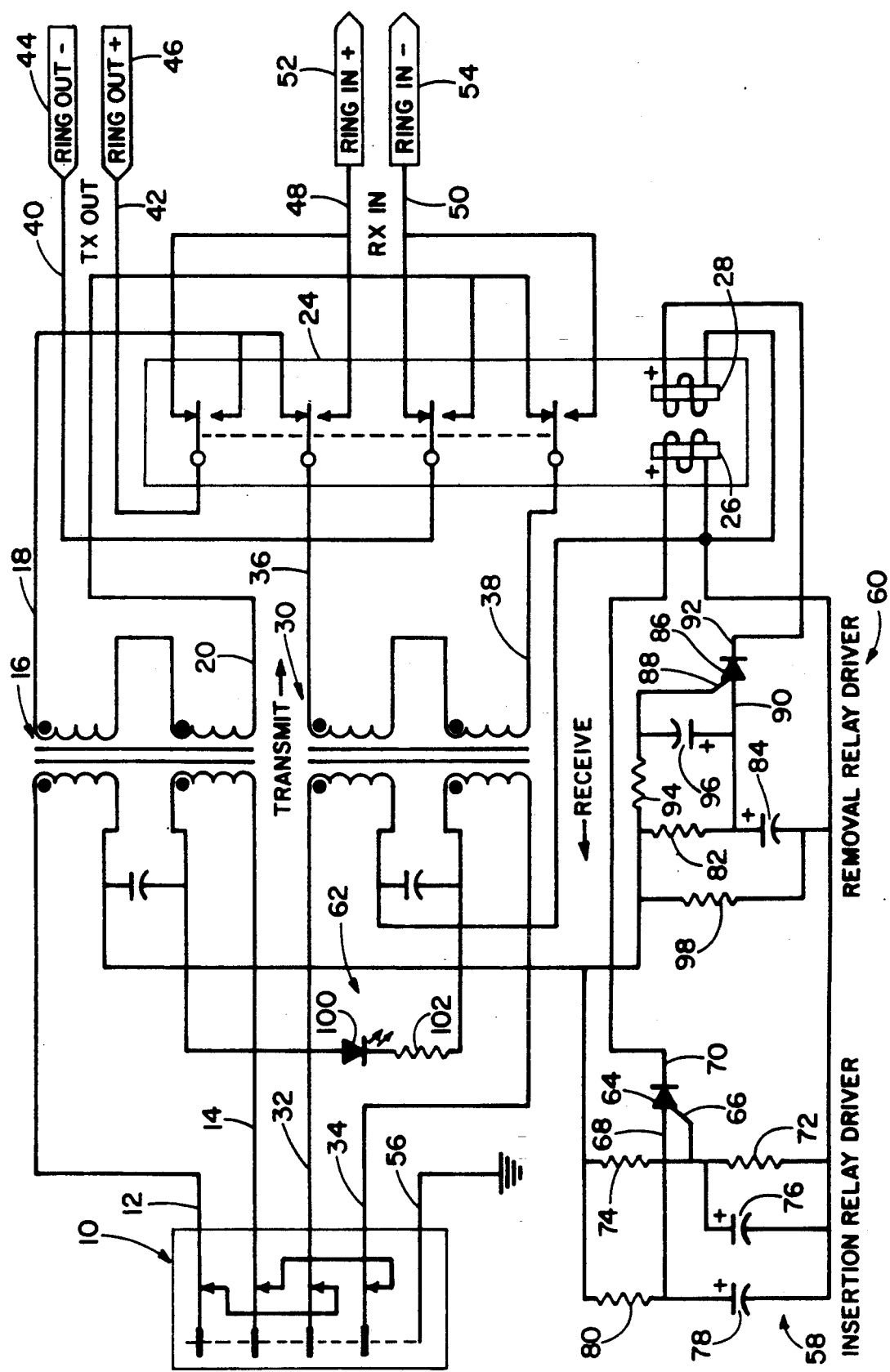

TOKEN RING WIRING CONCENTRATOR

BACKGROUND OF THE INVENTION

This invention is related to a token ring wiring concentrator and specifically to a lobe used in a token ring wiring concentrator for switching a workstation in and out of the system. Such a system is usually referred to as a "Multi-station Access Unit" or MAU. Such system is provided for in IEEE/ANSI 802.5 specification which refers to such system as a "Trunk Coupling Unit." Single lobes are combined with other identical lobes to form a complete concentrator. While the number of lobes in a concentrator can vary, the most popular configuration utilizes eight lobes and such is due primarily to the physical size of the token ring connector as it fits in a standard equipment rack.

As previously stated, the function of a Multi-station Access Unit is to electrically insert and remove a workstation from the system or more specifically, to connect or remove a workstation from a token ring network. Control of the inserting or removing a workstation from a token ring network is accomplished, as provided in the IEEE/ANSI standards, by means of DC voltage that is sometimes referred to as a "phantom voltage." This phantom voltage is applied between two pairs of conductors in the data cable that connects the workstation to the Multi-station Access Unit. When the phantom voltage is present at a preselected potential, the Multi-station Access Unit functions to insert the workstation into the network. When the phantom voltage is absent or falls below a preselected level, the workstation is removed from the network.

For background reference to information relating to the subject of this disclosure, reference may be made to IEEE/ANSI standards 802.5. For reference to previously issued United States Patents concerning the general subject matter of this disclosure, reference may be had to the following: U.S. Pat. Nos. 4,674,086; 4,905,230; 4,701,630; 4,696,047; 4,810,898; 4,782,245; 4,484,086; 4,825,095; 4,823,023; 4,820,935; 4,835,406; 4,674,086; 4,527,216; 4,701,630 and RE32,516.

SUMMARY OF THE INVENTION

This invention is concerned with a token ring network wiring concentrator for providing means to electrically insert or remove a workstation from a token ring system. The token ring network provides a low voltage DC control signal, sometimes referred to as a "phantom voltage" to control insertion and removal of a workstation. The present disclosure is directed to a lobe used in a token ring wiring concentrator for utilizing the control signals to effect the insertion or removal of a workstation from the token ring system.

A latching relay is employed for effecting the direct connection of a token ring connector to the input and output of a workstation. The latching relay has a closing solenoid that, when a surge of current is passed therethrough, functions to close the relay, and an opening solenoid that functions, upon receipt of a surge of current, to open the relay. The relay, once closed, remains closed until a surge of current is provided by a removal circuit in response to the absence of a control signal or "phantom voltage" from the token ring network.

An insertion relay driver circuit is connected to respond to the token ring control DC signal, providing a closing voltage signal to the latching relay when the controlling voltage DC signal exceeds a preselected minimum level for a preselected minimum time. When such signal is received for such preselected time, the latching relay is closed, inserting the workstation into the token ring network and the workstation will remain connected to the network until removed.

A removal relay driver circuit is responsive to the token ring control DC signal and provides a voltage surge to the latching relay, opening the relay, when the control DC signals or "phantom voltage" provided by the token ring network is absent or at least when it falls below a preselected minimum level.

The circuit of this disclosure provides a visual indication when a workstation is in the token ring network and when it is not. The insertion indicator in the form of a super high efficiency LED activated in response to the presence of DC control signals in conjunction with the removal relay driver circuit. The insertion indicator means simultaneously provides the required terminating resistance for the token ring control DC signal.

A better understanding of the invention will be had by reference to the following schematic drawing, the description of the preferred embodiment and the attached claims.

DESCRIPTION OF THE DRAWING

The drawing is a schematic diagram of a single lobe of a token ring wiring concentrator illustrating a latching relay, input and output isolation transformers, an insertion relay driver circuit, a removal relay driver circuit, and an insertion indicator, and illustrates the preferred arrangement of practicing the invention.

DESCRIPTION OF THE PREFERRED EMBODIMENT

A connector 10 is provided to connect the lobe to a token ring wiring workstation. Signals from the token ring wiring concentrator on conductors 12 and 14 are connected to the input of a first isolation transformer 16. The output of isolation transformer 16 on conductors 18 and 20 is fed to a latching relay 24. Relay 24 has a removal position, as illustrated in the drawing, and an insertion position that is opposite of that illustrated in the drawing. Relay 24 is of the latching type, that is, when closed it remains closed until a positive signal is applied to open the relay, and when the relay is open it remains open until a positive signal is applied to close the relay. A holding signal is not required. A closing solenoid 26 and an opening solenoid 28 are employed for control of the latching relay 24.

A second isolation transformer 30 is connected to connector 10 by conductors 32 and 34, and the transformer is connected to relay 24 by means of conductors 36 and 38. By means of conductors 40 and 42 the isolation transformer provides connection to the "ring out" locations 44 and 46. In like manner, conductors 48 and 50 connect the connector 10, by way of the isolation transformers 16 and 30 and through latching relay 24, to the "ring in" positions 52 and 54. Connector 10 has a ground conductor 56.

The system described to this point is typical of lobes forming parts of token ring wiring concentrators. A low level DC phantom voltage is available between conductors 12 and 32, and this low level voltage is used to control the insertion or removal of a workstation from the token ring.

For this purpose, this invention provides an insertion relay driver circuit, generally indicated by the numeral 58, and a removal relay driver circuit, generally indicated by the numeral 60. In addition, this disclosure provides a means of indicating when a workstation is inserted into a token ring network by means of an insertion indicator, generally indicated by the numeral 62.

The insertion relay driver circuit 58 employs a programmable unijunction transistor 64 that may be compared to an anode triggered SCR, that is, the programmable unijunction transistor 64 acts as a solid state switch. When the anode is more than 0.6 volts, positive than gate 66, the transistor turns "on" and current flows from anode 68 to a cathode 70. The programmable unijunction transistor will remain "on" regardless of the voltage at gate 66 until the anode/cathode current falls below the minimum valley current, at which time the transistor will turn "off".

The operation of the insertion relay driver circuit 58 is as follows. Phantom voltage is applied to a voltage divider circuit formed of resistors 72 and 74 that set the threshold voltage at gate 66 of transistor 64. Capacitor 76 filters this voltage and prevents transistor 64 from being turned "on" prematurely by a transit in the phantom voltage supply. Capacitor 78 is charged from the phantom voltage through resistor 80. When the voltage on capacitor 78 exceeds the transistor gate voltage by 0.6 volts, then transistor 64 turns "on" and discharges capacitor 78 through the transistor anode 68, cathode 70 and solenoid 26 of latching relay 24. This pulse of current is enough to operate the relay and thus insert the workstation into the token ring network. It is understood that the activation of solenoid 26 causes the latching relay 24 to move to the position opposite of that illustrated in the drawing. Since the current through resistor 80 is more than the valley current of transistor 68, the transistor stays "on" and capacitor 78 remains discharged. Transistor 64 will not turn "off" until the phantom voltage is removed.

The ring removal relay driver circuit 60 operates in a similar manner. Resistor 82 charges capacitor 84. The removal relay driver circuit 60 includes a transistor 86 which, as with the insertion relay driver circuit 58, is a programmable unijunction transistor having a gate 88, an anode 90 and a cathode 92. The potential at gate 88 of transistor 86 is the same as the phantom voltage which, under normal conditions, will keep transistor 86 turned "off". When the phantom voltage is removed the gate potential drops below the potential at anode 90, which turns transistor 86 "on" and discharges capacitor 84 through transistor 86 and through latching relay solenoid 28 to open the relay which removes the workstation from the token ring network. The time constant provided by resistor 94 and capacitor 96 keeps the latching relay from tripping prematurely on a momentary loss of phantom voltage. Resistor 98 is provided to draw the remaining phantom current.

Ring insertion indicator 62 is formed of a LED 100 and a resistor 102. This circuit takes advantage of two unique features. First, the current in the second phantom circuit is normally wasted with a load balancing resistor. In the circuit of this disclosure this otherwise wasted current is utilized to provide power to light LED 100. A second feature that makes the circuit a reality is the availability of a new technology AlGaAs low current LED 100 to serve as an indicator. These LEDs have more than ample brightness at 1.3 mA current level. Thus, according to the circuit herein described indicator 62 serves a double function as the phantom load balance, as well as a ring insertion indicator.

The circuit herein described has unique features compared with known circuits utilized in token ring wiring concentrators. One such feature is the use of the second phantom drive to provide the ring insertion indicator, as well as the terminal resistance called for in the IEEE 802.5 code requirement. A second important feature is the unique arrangement of the relay driver circuits 58 and 60. These circuits combine timing circuitry with relay drivers. Specifications typically call for a maximum delay of 5 seconds to insert a workstation into a token ring. This allows the insertion relay driver circuit to store enough energy in capacitor 78 to activate latching relay 24. Thus, time delay and energy storage is provided in the same capacitor 78 and resistor 80 combination.

Another feature of the insertion relay driver is that the timing capacitor remains discharged once relay 24 is tripped. This feature keeps the circuit from accidentally reactivating the relay if the phantom voltage bounces during removal, since there is no energy stored in capacitor 78 to trip the relay.

The ring removal relay driver circuit 60 has similar features. Resistor 82 and capacitor 84 are the same values as resistor 80 and capacitor 78 of the insertion relay driver circuit. This guarantees that there will always be enough energy in capacitor 84 to remove the workstation from the token ring wiring concentrator since there was enough in capacitor 78 to insert the station into the token ring—that is, since solenoids 26 and 28 function with the same energy surge, and since the driving capacitors are the same and are charged by the same phantom voltage, dependability of circuit activation is assured.

Removal timing is also built in the circuit with resistor 94 and capacitor 96. IEEE specifications provide that the workstation must not be removed upon a phantom voltage interruption of 50 mS or less, but must be removed when the phantom voltage is removed for 200 mS. The circuit herein described accomplishes this objective.

An additional benefit of driving the relay solenoids 26 and 28 with capacitors is that the coil current decays slowly. This eliminates the requirements of "catch" diodes normally found in such circuits that are needed to absorb the inductive kick produced if the relay coils are turned "off" abruptly.

The net result of the unique insertion driver circuit 58 and removal driver circuit 60 is the provision of a self powered Multi-station Access Unit with an indicator, all of which utilizes only eleven components.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. In a token ring network wiring concentrator providing a DC control signal to control insertion and removal of a work station, an improved concentrator lobe comprising:

a latching relay having a closed position in which communication is provided between a token ring network and a workstation and an open position in which such communication is severed;

an insertion relay driver circuit responsive to a token ring DC control signal providing a closing voltage signal to said latching relay when the DC control signal reaches a preselected minimum level for a preselected minimum time;

a removal relay driver circuit responsive to a token ring DC control signal providing a removal voltage signal to said latching relay when the DC control falls below a preselected level for a preselected time; and insertion indicator means responsive to a token ring DC control signal for providing indication of insertion of a workstation in a token ring and simultaneously providing terminating resistance for the token ring DC control signal, and wherein said latching relay has a closing solenoid and an opening solenoid and wherein said closing voltage signal provided by said insertion relay driver circuit is in the form of a DC voltage pulse coupled to said closing solenoid, and wherein removal voltage signal provided by said removal relay driver circuit is in the form of a DC voltage pulse coupled to said opening solenoid.

2. An improved token ring insertion and removal circuit according to claim 1 wherein said insertion relay driver comprises:

an insertion programmable unijunction transistor having an anode, a cathode and a gate and programmed to turn "on" when the voltage at its gate exceeds the voltage at its anode by a preselected amount;

circuit means applying a selected ratio of the DC control signal to said insertion transistor gate;

circuit means to delay changes in said selected ratio of the DC control signal to said insertion transistor gate; and circuit means connecting said insertion transistor anode and cathode in series with said latching relay to close said latching relay when said insertion transistor is turned "on".

3. An improved token ring insertion and removal circuit according to claim 2 wherein said circuit means connecting said insertion transistor to close said latching relay when said insertion transistor is turned "on" comprises:

a capacitor charged by the DC control signal.

4. An improved token ring insertion and removal circuit according to claim 1 wherein said removal relay driver comprises:

a removal programmable unijunction transistor having an anode, a cathode and a gate and programmed to turn "on" when the voltage at its gate drops below the voltage at its anode;

circuit means applying the DC control signal to said removal transistor gate;

circuit means to delay changes in said DC control signal applied to said removal transistor gate; and circuit means connecting said removal transistor anode and cathode in series with said latching relay to open said latching relay when said removal transistor is turned "on".

5. An improved token ring insertion and removal circuit according to claim 4 wherein said circuit means connecting said removal transistor to open said latching relay when said removal transistor is turned "on" comprises:

a capacitor charged by the DC control signal.

6. An improved token ring insertion and removal circuit according to claim 1, wherein said insertion relay driver circuit comprises:

a programmable unijunction transistor having an anode, a cathode and a gate;

a voltage divider circuit in parallel with the DC control signal in the form of a first and second resistor in series providing a reduced voltage at a connection between the resistors that is applied to said transistor gate;

a first capacitor in parallel with one of the resistors in said voltage divider circuit whereby the voltage applied to said transistor gate is delayed as the capacitor is charged, the transistor being programmed to turn "on" when the voltage at the gate reaches a preselected level above the voltage at the transistor anode, the transistor cathode being connected to said latching relay closing solenoid;

a second capacitor connected between said transistor anode and said latching relay closing solenoid; and a charging resistor in series with said second capacitor, the seried second capacitor and charging resistor being in parallel with the DC control signal, and whereby when the charge across said first capacitor reaches a preselected level said transistor is turned "on", discharging said second capacitor through said transistor and said closing solenoid to close said latching relay, the timing circuity being thus combined with the circuit driving said latching relay.

* * * * *